United States Patent [19]

Yoshino et al.

[11] Patent Number: 5,174,329
[45] Date of Patent: Dec. 29, 1992

[54] LOADING PRESSURE COMPENSATION TYPE LOGIC VALVE

[75] Inventors: Kazunori Yoshino, Kobe; Yoshiyuki Shimada, Akashi, both of Japan

[73] Assignee: Shin Caterpillar Mitsubishi Ltd., Tokyo, Japan

[21] Appl. No.: 778,349

[22] Filed: Oct. 16, 1991

[30] Foreign Application Priority Data

Oct. 18, 1990 [JP] Japan .................... 2-279663

[51] Int. Cl.⁵ .................. G05D 7/00; F16K 31/383
[52] U.S. Cl. .................. 137/501; 91/446; 137/614.18; 137/625.3; 251/29
[58] Field of Search ............ 91/446; 137/501, 614.18, 137/625.3; 251/29

[56] References Cited

U.S. PATENT DOCUMENTS

| | | | |
|---|---|---|---|
| 3,596,677 | 8/1971 | Clark et al. | 137/501 |
| 3,724,494 | 4/1973 | Alber | 137/501 |
| 4,462,566 | 7/1984 | French | 137/501 X |
| 4,809,746 | 3/1989 | Wolfges | 137/501 |
| 4,997,159 | 3/1991 | Yoshino et al. | 251/29 |
| 5,000,220 | 3/1991 | Eick et al. | 137/501 |

Primary Examiner—Gerald A. Michalsky
Attorney, Agent, or Firm—Morrison Law Firm

[57] ABSTRACT

A fluid-operated valve includes a control spool, actuated by a source of pilot pressure to control a pilot flow of fluid from a loading pressure inlet port to a drain line. The pilot flow passes a throttle which reduces the fluid pressure acting in one direction, thereby performing stroke compensation of the actuation of a valve poppet. A differential pressure compensation valve is moved to partially block fluid flow to a rate control orifice group in response to a difference in pressure on the two sides of the rate control orifice group to control further the actuation of the valve poppet, whereby differential pressure is compensated.

2 Claims, 3 Drawing Sheets

LOADING PRESSURE COMPENSATION TYPE LOGIC VALVE

BACKGROUND OF THE INVENTION

1. Field of the Invention

The present invention relates to a loading pressure compensation type logic valve to control the flow rate of a hydraulic pressure control valve which is used, for example, in construction machines.

2. Description of the Prior Art

The applicant of the present invention has presented loading pressure compensation type logic valves, which are the prior art of the present invention. Japanese Patent Publication No. 163503/1990 and the specification and the drawings of Japanese Utility Model Application No. 89878/1989 disclose such devices. These loading pressure compensation type logic valves are capable of compensating for the effects of loading pressure on stroke control.

The pressure compensation type logic valve described in the specification and the drawings of Japanese Utility Model Application No. 89878/1989 is explained hereunder, referring to FIG. 2.

The stroke length of a valve poppet 44 which has a flow rate control orifice group 74 is determined by a balance between loading pressure $P_{IN}$ at a loading pressure inlet port 96, a pressure in a poppet spring chamber 55, the opposed pressure-receiving areas (both portions have identical pressure-receiving areas) and a spring force of a poppet spring 56. It is possible to linearly control the difference between loading pressure $P_{IN}$ at loading pressure inlet port 96 and the pressure in poppet spring chamber 55, which determines the aforementioned balance, using an outside pilot pressure $P_i$ and such equipment as spools 46 and 47.

More precisely, loading pressure $P_{IN}$ at loading pressure inlet port 96 is directed to pressure chambers 63 and 64 through orifices 77 and 83 respectively (pressure $P_{64}$ in pressure chamber 64 is virtually identical to loading pressure $P_{IN}$) and brought into equilibrium by forces exerted on pressure receiving areas $A_{63}$ and $A_{47}$ ($A_{63} = A_{47}$) at the ends of spools 46 and 47. The ends of spools 46 and 47 respectively facing pressure chambers 63 and 64 have identical diameters.

Outside pilot pressure $P_i$ applied to an outside pilot pressure inlet port 97 is directed into a stepped pressure chamber 66 (its pressure receiving area is represented by $A_{66}$) of spool 46. As shown in the following equation, pressure $P_{63}$ in pressure chamber 63, which is equal to pressure $P_{55}$ in poppet spring chamber 55, can be controlled by using the pressure described above and a spring force $F_{70}$ of a spool spring 70.

$$P_{64} \cdot A_{47} + F_{70} = P_i \cdot A_{66} + P_{63} \cdot A_{63}$$

Therefore, $$P_{IN} \cdot A_{63} + F_{70} = P_i \cdot A_{66} + P_{55} \cdot A_{63}$$

Consequently, differential pressure $\Delta P$ between loading pressure $P_{IN}$ at loading pressure inlet port 96 and pressure $P_{55}$ in poppet spring chamber 55, which determines the aforementioned balance, is:

$$\Delta P = P_{IN} - P_{55} = (P_i \cdot A_{66} - F_{70})/A_{63}$$

which is a linear function of outside pilot pressure $P_i$ and therefore not affected by loading pressure $P_{IN}$.

As described above, as far as stroke control is concerned, a valve according to the prior art is not influenced by loading pressure $P_{IN}$. However, flow from loading pressure inlet port 96 through flow rate control orifice group 74, flow rate control chamber 54 and poppet seat 52 into drain chamber 53 is conrolled only by the degree of aperture of flow rate control orifice group 74. In other words, the apparatus of FIG. 2 lacks a mechanism to maintain a differential pressure between the front side and the rear side of orifice group 74, i.e. the differential pressure between loading pressure inlet port 96 and flow rate control chamber 54. As a consequence, when controlling a great quantity of fluid, a valve according to the prior art functions only as a conventional throttle valve.

Further, as shown in FIG. 3, it is possible to make a flow rate control mechanism that is free from the effect of loading pressure by installing flow control valve 95 between valve poppet 44 and loading pressure inlet port 96 of a logic valve otherwise the same as shown in FIG. 2. However, such a structure presents the problem that the two-part valve structure increases the bulk of the valve and adds leaks $Q_3$ and $Q_4$ at flow control valve 95 to leaks $Q_1$ and $Q_2$ already existing in the logic valve of FIG. 2.

OBJECTS AND SUMMARY OF THE INVENTION

It is an object of the invention to provide a loading pressure compensation type logic valve which overcomes the drawbacks of the prior art.

It is a further object of the invention to provide a loading pressure compensation type logic valve which is capable of compensating the effect of loading pressure on the stroke control of its valve poppet by adding a flow rate control mechanism that is not affected by loading pressure and still renders the entire valve compact, without increasing leaks, by incorporating the function of a flow rate control valve in the logic valve.

Briefly stated, the present invention provides a fluid-operated valve which includes a control spool, actuated by a source of pilot pressure to control a pilot flow of fluid from a loading pressure inlet port to a drain line. The pilot flow passes a throttle which reduces the fluid pressure acting in one direction, thereby performing stroke compensation of the actuation of a valve poppet. A differential pressure compensation valve is moved to partially block fluid flow to a rate control orifice group in response to a difference in pressure on the two sides of the rate control orifice group to control further the actuation of the valve poppet, whereby differential pressure is compensated.

The above, and other objects, features and advantages of the present invention will become apparent from the following description read in conjunction with the accompanying drawings, in which like reference numerals designate the same elements.

DETAILED DESCRIPTION OF PREFERRED EMBODIMENTS

Figure 1:
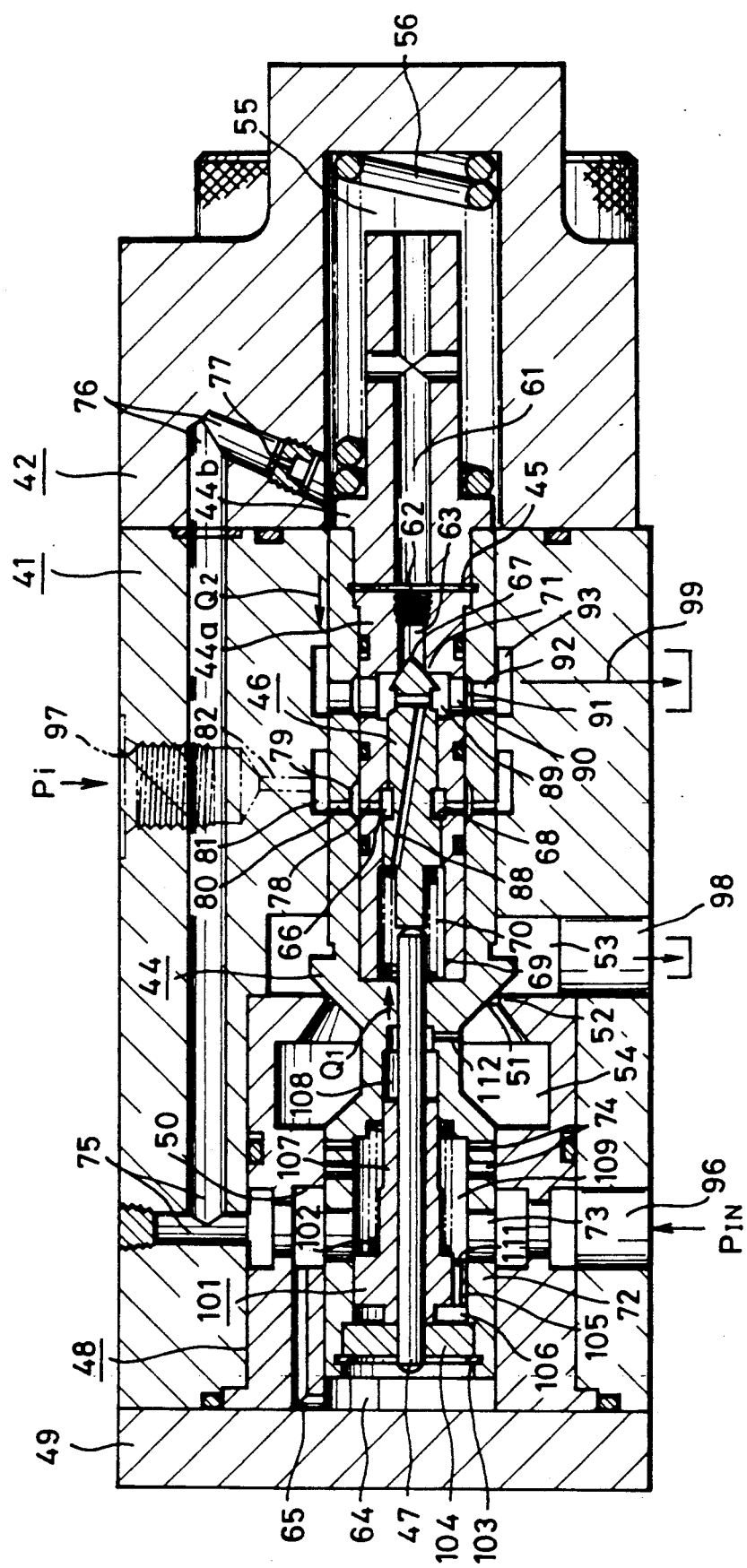
FIG. 1 is a cross section of a loading pressure compensation type logic valve according to an embodiment of the present invention.

The present invention will be explained in detail hereunder, referring to an embodiment thereof shown in FIG. 1.

A first housing 41 of a loading pressure compensation type logic valve contains a valve poppet 44 is slidably fitted therein. Valve poppet 44 incorporates a sleeve 44a which is fastened thereto by means of A snap ring 45 and thus forms a part of valve poppet 44. A control spool 46 and a pressure transfer spool 47 are slidably fitted in sleeve 44a and valve poppet 44 respectively.

A housing 42 is sealed to an end of housing 41. A spring receiver 44b at a right end of valve poppet 44 extends into a housing 42. A poppet spring 56, which will be explained later, is attached to spring receiver 44b.

A loading pressure inlet port 96 permits the introduction of loading pressure $P_{IN}$ into housing 41. A flow rate control sleeve 48 is fitted in a hollow in housing 41 facing loading pressure inlet port 96. An end plate 49 closes the end of housing 41 and secures flow rate control sleeve 48 in position.

As is conventional, loading pressure $P_{IN}$ is produced by an actuator of a hydraulic cylinder or other similar equipment for connection to loading pressure inlet port 96 to allow fluid to flow therethrough.

An annular entrance chamber 50 in flow rate control sleeve 48 is connected to loading pressure inlet port 96. The loading inlet pressure from annular entance chamber 50 passes through a flow rate control chamber 54 to an annular poppet seat 52 which faces a tapered portion 51 on valve poppet 44. Flow rate control chamber 54 is annular and is separated from drain chamber 53 by said poppet seat 52. Drain chamber 53 is connected to an external receptacle such as a tank through a drain port 98.

Housing 42 includes poppet spring chamber 55 which contains poppet spring 56. Poppet spring 56 urges spring retainer 44b in the leftward direction in the drawing to urge tapered portion 51 of valve poppet 44 against poppet seat 52.

Spring receiver 44b includes a through channel 61 bored therethrough. A tapped hole 62 is bored in sleeve 44a in the valve poppet for purpose of disassembly. Poppet spring chamber 55 is connected to pressure chamber 63 which faces control spool 46.

Loading pressure inlet port 96 is connected, through annular entrance chamber 50 and channel 65 to loading pressure chamber 64. Loading pressure chamber 64 faces one end of pressure transfer spool 47 opposite to the location of poppet spring chamber 55, with valve poppet 44 in between. The sectional area of loading pressure chamber 64 is equal to the sectional area of poppet spring chamber 55.

Control spool 46 has pressure-receiving surfaces 67 and 68 which respectively face pressure chamber 63 and stepped pressure chamber 66. As described hereunder, pressure-receiving surface 67 is restrained from being pushed against spool seat 71 by spool spring 70 in a spool spring chamber 69.

Valve poppet 44 includes a cylindrical portion 72 which is fitted to slide in flow rate control sleeve 48 at the portion of valve poppet 44 facing loading pressure inlet port 96. An orifice 73 and an orifices group 74 are bored in cylindrical portion 72. Orifice 73 compensates for pressure difference and orifice group 74 control the flow rate through the valve.

Loading pressure inlet port 96 is connected to poppet spring chamber 55 through a channel 75 bored in housing 41, a channel 76 bored in housing 42 and orifice 77 in channel 76.

Stepped pressure chamber 66 around control spool 46 is connected to outside pilot pressure inlet port 97 through a hole 78 bored in valve poppet sleeve 44a, a surrounding groove 79, a hole 80 in valve poppet 44, a surrounding groove 81, and a hole 82 in housing 41. Conventionally, outside pilot pressure inlet port 97 receives pilot pressure from a manually-controlled valve (not shown) controlling a source of hydraulic pressure, which are positioned outside the system and not shown in the drawing. Surrounding groove 81 in the route to introduce pilot pressure has a width in the axial direction to accommodate the range of axial motion of hole 80 of valve poppet 44 during operation of the valve.

With the configuration as above, loading pressure at loading pressure inlet port 96 is directed through channel 65 into loading pressure chamber 64 and through orifice 77 into spring chamber 55. Pressure in spring chamber 55 is directed through channel 61 into pressure chamber 63 facing control spool 46. Outside pilot pressure is introduced from outside pilot pressure inlet port 97 into stepped pressure chamber 66 to apply pressure on ring-shaped pressure receiving surface 68 of control spool 46. Under normal conditions, in the absence of outside pilot pressure, control spool 46 is kept pushed against spool seat 71 by spool spring 70. In these same conditions, pressure conveyance spool 47 is kept pushed against control spool 46 by pressure acting on its end facing loading pressure chamber 64.

Next, the structure of the flow rate control valve to eliminate the effect of loading pressure is explained hereafter. A differential pressure compensation valve 101 is slidably fitted radially between pressure transfer spool 47 and cylindrical portion 72 of valve poppet 44 so as to be able to slide with respect to both pressure transfer spool 47 and cylindrical portion 72. Differential pressure compensation valve 101 is urged to the left, as shown in, FIG. 1 by a valve spring 102. Leftward motion of differential pressure compensation valve is stopped by contact with a stopper 104 affixed inside cylindrical portion 72 using, for example, a snap ring 103.

A larger diameter pressure chamber 106 in cylindrical portion 72 faces a larger diameter pressure chamber 105 of differential pressure compensation valve 101. A smaller diameter pressure chamber 108 in cylindrical portion 72 applies pressure to a smaller diameter portion 107 of differential pressure compensation valve 101. A valve spring chamber 109 is disposed in cylindrical portion 72 between larger diameter pressure chamber 105 and smaller diameter portion 107. Valve spring chamber 109 connects together differential pressure compensation orifice 73 and flow rate control orifice group 74. An orifice 111 bored in larger diameter chamber 105 connects larger diameter pressure chamber 106 to valve spring chamber 109. An orifice 112 bored in valve poppet 44 connects smaller diameter pressure chamber 108 to flow rate control chamber 54.

Next, the function of a loading pressure compensation type logic valve according to the present invention is explained hereunder.

When outside pilot pressure $P_i$ is absent from pilot pressure inlet port 97, in other words when the pressure in stepped pressure chamber 66 is equal to the tank pressure, the pressure at loading pressure inlet port 96 is applied to control spool 46 on a path through channels 75 and 76, orifice 77, poppet spring chamber 55, channel 61 and pressure chamber 63. The pressure at loading pressure inlet port 96 is also applied to pressure transfer spool 47 on a path through entrance chamber 50, channel 65 and loading pressure chamber 64. Spool 46 remains in balance, being pushed against spool seat 71 by the urging of spool spring 70, because the pressure-receiving area of control spool 46 exposed to pressure from pressure chamber 63 is equal to the pressure-receiving area of pressure transfer spool 47 exposed to pressure from loading pressure chamber 64.

When outside pilot pressure $P_i$ is applied to outside pilot pressure inlet port 97, a force, equal to the product of outside pilot pressure $P_i$ and the pressure receiving area of ring-shaped pressure receiving surface 68, urges spool 46 leftward. Initially, spool 46 does not move until the force equals a preload of spool spring 70. When outside pilot pressure $P_i$ is increased to a value that produces a force slightly exceeding the preset load of spool spring 70, control spool 46 moves out of contact with spool seat 71, thereby allowing pressurized fluid in poppet spring chamber 55 to flow on a path through channel 61, pressure chamber 63, spool seat 71 and into bleed chamber 89 from which it exits on a drain line 99. At that time, pressurized fluid flows from loading pressure inlet port 96 through orifice 77 into poppet spring chamber 55, but, due to throttle resistance of orifice 77, the pressure in spring chamber 55 remains less than the pressure in loading pressure chamber 64, thereby balancing control spool 46 at a position floating slightly above spool seat 71. Normally, the distance is extremely short, because the flow rate is controlled by orifice 77.

When outside pilot pressure $P_i$ is further increased, thereby increasing the pressure on ring-shaped pressure receiving surface 68 of control spool 46, control spool 46 moves further away from spool seat 71. As a result, there is an increase in the pressure difference $\Delta P$ in loading pressure chamber 64 and poppet spring chamber 55.

When outside pilot pressure $P_i$ is further increased to move control spool 46 even further away from spool seat 71, the force represented by the product of pressure receiving sectional area A of either end of valve poppet 44 (the sectional areas of the two ends of the valve poppet are identical because the two ends have the same diameter) and differential pressure $\Delta P$ between loading pressure chamber 64 and spring chamber 55 is brought to a value equal to the preset load of poppet spring 56. Then, when outside pilot pressure $P_i$ is even further increased, differential pressure $\Delta P$ increases even further to produce a force $A \cdot \Delta P$ which exceeds the preset load of poppet spring 56. This moves valve poppet 44, rightward, thereby separating tapered portion 51 from poppet seat 52.

When outside pilot pressure $P_i$ is further increased, resulting in differential pressure $\Delta P$ on valve poppet 44 further increasing, tapered portion 51 moves further away from poppet seat 52. Orifices in flow rate control orifice group 74 in cylindrical portion 72 begin to open to flow rate control chamber 54. As outside pilot pressure $P_i$ is further increased, with differential pressure $\Delta P$ on valve poppet 44 proportionally increasing, valve poppet 44 moves proportionally to increase the load on poppet spring 56. Therefore, the aperture area of flow rate control orifice group 74 gradually increases.

The flow rate control function to eliminate effect of loading pressure during the linear control of stroke as described above is explained hereunder.

Figure 2:
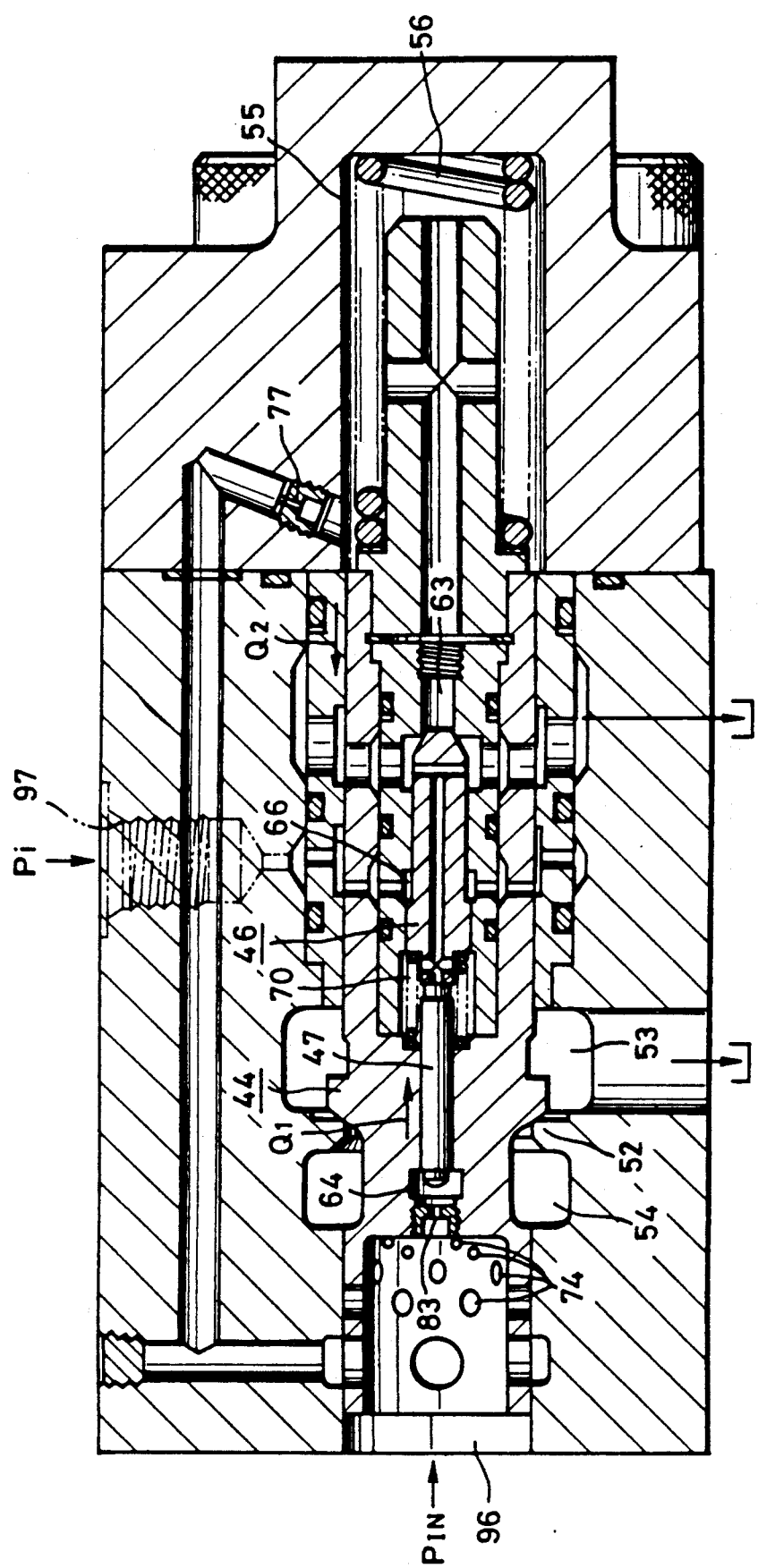
FIG. 2 is a cross section of a conventional logic valve.
Figure 3:
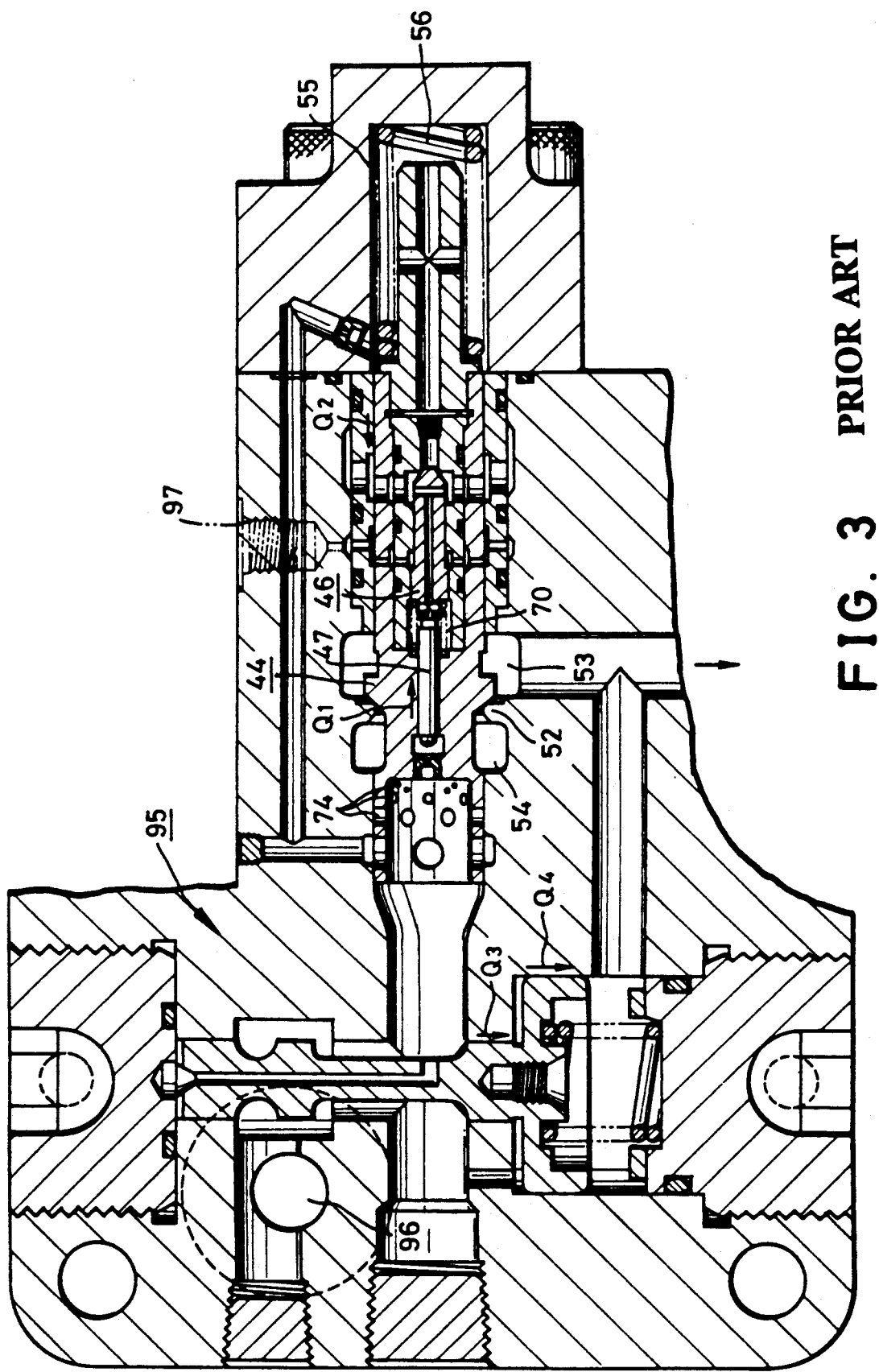
FIG. 3 is a cross section of a modified example of the conventional logic valve.

(1) When outside pilot pressure $P_i$ is not applied: loading pressure $P_{IN}$ at loading pressure inlet port 96 is conveyed through channel 65 to loading pressure chamber 64 at the end of valve poppet 44 and also through orifice 77 to poppet spring chamber 55. Since both ends of valve poppet 44 respectively facing the two chambers have identical diameters and therefore the same pressure receiving area, hydraulic pressure working on the two ends of valve poppet 44 offset each other. As a consequence, valve poppet 44 remains stationary, being urged against poppet seat 52 by the spring force of poppet spring 56. Leaks in the valve is minimal—only Q1 and Q2—as in the case of the prior art shown in FIG. 2.

(2) When outside pilot pressure $P_i$ is applied: as described in details in the paragraph of "Prior Art", due to the functions of linear stroke-control spool 46 and pressure transfer spool 47, it is possible to control strokes of valve poppet 44 and adjust the aperture of flow rate control orifice group 74 without these functions being affected by loading pressure in differential pressure $P_{IN}$. Differential pressure compensation valve 101 slides between pressure transfer spool 47 and cylindrical portion 72 of poppet 44 and is normally pushed against stopper 104 by spring force $F_{102}$ of valve spring 102. However, when poppet 44 initiates its stroke, opening poppet seat 52 and admitting pressure $P_{54}$ to flow rate control chamber 54, which was previously as low as the pressure in drain chamber 53, to be applied to smaller diameter pressure chamber 108 through orifice 112, the differential pressure between pressure $P_{109}$ which has been conveyed from valve spring chamber 109 to larger diameter pressure chamber 106 through orifice 111, and pressure $P_{108} (=P_{54})$ in smaller diameter pressure chamber 108 causes differential pressure compensation valve 101 to move in a direction effective to resist spring force $F_{102}$ of valve spring 102 and close differential pressure compensation orifice 73. At that time, because of the flow from entrance chamber 50 into drain chamber 53 on the path through orifice 73, valve spring chamber 109, orifice group 74 and flow rate control chamber 54, the throttling function of larger diameter pressure chamber 105 of differential pressure compensation valve 101 at differential pressure compensation orifice 73 generates differential pressure between entrance chamber 50 and valve spring chamber 109, thereby reducing pressure $P_{109}$ in valve spring chamber 109 in accordance with the pressure decrease in flow rate control chamber 54.

When the pressure-receiving area of an end of said smaller diameter portion 107 is "a", the force working upon differential pressure compensation valve 101 can be formulated as follows:

$$P_{109} \cdot a = P_{108} \cdot a + F_{102}.$$

Therefore, the pressure $P_{109}$ in spring chamber 109 is determined by the following equation:

$$P_{109} = P_{54} + F_{102}/a.$$

Consequently, the differential pressure generated between valve spring chamber 109 and flow rate control chamber 54, with flow rate control orifice group 74 in between, is constant, as shown in the following equation:

$$P_{109} - P_{54} = F_{102}/a.$$

Thus, it is possible to perform linear control of the aperture adjustment of flowrate control orifice group 74.

As described above, a loading pressure compensation type logic valve according to the present invention is capable of compensation of loading pressure for both stroke control and flow rate control.

According to the present invention, it is possible to achieve flow rate control with loading pressure compensation while maintaining the desirably characteristics of the previously developed logic valve, such as linear stroke control with loading pressure compensation, compactness and low leak characteristics.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A loading pressure compensation logic valve comprising:
    a housing;
    a valve poppet slidably fitted in said housing;
    a flow rate control orifice group in a cylindrical portion movable with said valve poppet;
    a loading pressure chamber facing an end of said valve poppet where said cylindrical portion is located;
    a loading pressure inlet port connected to said loading pressure chamber;
    a poppet spring chamber facing an opposed end of said valve poppet;
    an orifice connecting said loading pressure inlet port to said poppet spring chamber;
    a poppet spring in said poppet spring chamber;
    said poppet spring being preloaded to urge said valve poppet toward a poppet seat;
    a flow rate control chamber within said flow rate control orifice group;
    a drain chamber on a side of said poppet seat opposite to said flow rate control chamber;
    a control spool;
    a spool seat in said valve poppet;
    a spool spring effective for urging said control spool into sealing contact with said spool seat;
    means for controlling a force on said control spool in response to an outside pilot pressure;
    said control spool being exposed to a pressure in said poppet spring chamber;
    a pressure transfer spool in said valve poppet for conveying a force developed by pressure from said loading pressure chamber to said control spool;
    a differential pressure compensation orifice in said valve poppet, at a position closer to the loading pressure inlet port than is said flow rate control orifice group;
    a valve spring chamber connecting said differential pressure compensation orifice to said flow rate control orifice group;
    a differential pressure compensation valve radially disposed between said pressure transfer spool and said flow rate control orifice group;
    a valve spring in said valve spring chamber;
    said differential pressure compensation valve being slidable in an axial direction and pushed by said valve spring in a direction effective to open said differential pressure compensation orifice, thereby controlling a degree of opening of said differential compensation orifice;
    a larger diameter pressure chamber adjacent an end of said differential pressure compensation valve, facing in a direction of urging of said valve spring;
    means for connecting said larger diameter pressure chamber to said valve spring chamber; and
    a smaller diameter pressure chamber adjacent another end of said differential pressure compensation valve and connected to said flow rate control chamber through an orifice.

2. A loading pressure compensation valve comprising:
    means for admitting a loading pressure to said loading pressure compensation valve;
    a control spool;
    means for applying equal forces in opposed directions on said control spool in the absence of flow through said loading pressure compensation valve;
    said means for applying equal forces including a direct means in a first direction, and a throttled means in a second direction;
    a spool seat;
    resilient means for urging said control spool into sealing contact with said spool seat;
    a drain past said spool seat;
    means, responsive to an external pilot pressure for urging said spool out of contact with said spool seat, whereby a fluid is permitted to flow from said means for admitting a loading pressure to said drain;
    said throttled means reducing a pressure in said second direction, whereby said direct means tends to urge said control spool in a direction opposing action of said external pilot pressure;
    a valve poppet axially movable in said loading pressure compensation valve;
    a poppet seat sealingly seating said valve poppet;
    a flow rate control chamber on a first side of said poppet seat;
    a drain port on a second side of said poppet seat;
    a valve spring effective for urging said valve poppet into sealing contact with said poppet seat;
    a rate control orifice group in a cylindrical portion of said poppet;
    a differential pressure compensation valve in said cylindrical portion;
    a valve spring chamber in said cylindrical portion surrounding a portion of said differential pressure compensation valve;
    said rate control orifice group being effective, when said valve poppet is moved axially, for permitting fluid flow from said valve spring chamber to said flow rate control chamber;
    a larger diameter portion in a larger diameter pressure chamber at a first end of said differential pressure compensation valve;
    a smaller diameter portion in a smaller diameter pressure chamber at a second end of said differential pressure compensation valve;

said valve spring chamber being disposed between said larger diameter portion and said smaller diameter portion;

means for blocking said rate control orifice group when said valve poppet is in its sealing position against said poppet seat;

first and second areas on said valve poppet;

said first and second areas being substantially equal;

means for exposing said first area to said loading pressure;

means for exposing said second area to said throttled means, whereby said valve remains balanced in an absence of fluid flow past said control spool, and becomes unbalanced in the presence fluid flow past said control spool;

an orifice connecting said loading pressure to said spring chamber; and means, in the presence of a pressure difference in said spring chamber and said flow rate control chamber, to move said differential pressure compensation valve in a direction effective to permit said larger diameter portion to block said orifice, whereby a fluid pressure in said spring chamber is reduced, and differential pressure is compensated.

* * * * *